United States Patent

Skoog

[11] 4,251,081
[45] Feb. 17, 1981

[54] PISTON ROD SEAL

[76] Inventor: Knut A. Skoog, Vråkvägen 7, S-274 00 Skurup, Sweden

[21] Appl. No.: 100,967

[22] Filed: Dec. 6, 1979

[30] Foreign Application Priority Data

Dec. 12, 1978 [SE] Sweden ................. 7800087

[51] Int. Cl.³ .............................. F16J 15/56
[52] U.S. Cl. ........................ 277/3; 277/114
[58] Field of Search ................. 277/3, 27, 15

[56] References Cited

U.S. PATENT DOCUMENTS

| | | | |
|---|---|---|---|
| 3,810,634 | 5/1974 | Hakanson | 277/3 |
| 3,848,877 | 11/1974 | Bengtsson | |
| 4,083,566 | 4/1978 | Bengtsson | |
| 4,146,237 | 3/1979 | Bergman | 277/3 |
| 4,170,363 | 10/1979 | Bergman | |

*Primary Examiner*—Robert I. Smith
*Attorney, Agent, or Firm*—Finnegan, Henderson, Farabow, Garrett & Dunner

[57] ABSTRACT

Piston rod sealing means of the type in which oil is applied to the low pressure side (5) of the seal and used to prevent escape of high pressure gas between the piston rod (6) surface and a surrounding surface of a plastic material gland (12) are improved by providing the gland (12) with a tubular extension (15) of slightly increasing inner diameter in the direction against the high pressure side (4) of the seal. The gland (12) is forced against the piston rod surface, but the tubular extension (15) is not influenced by the force on the gland (12).

2 Claims, 1 Drawing Figure

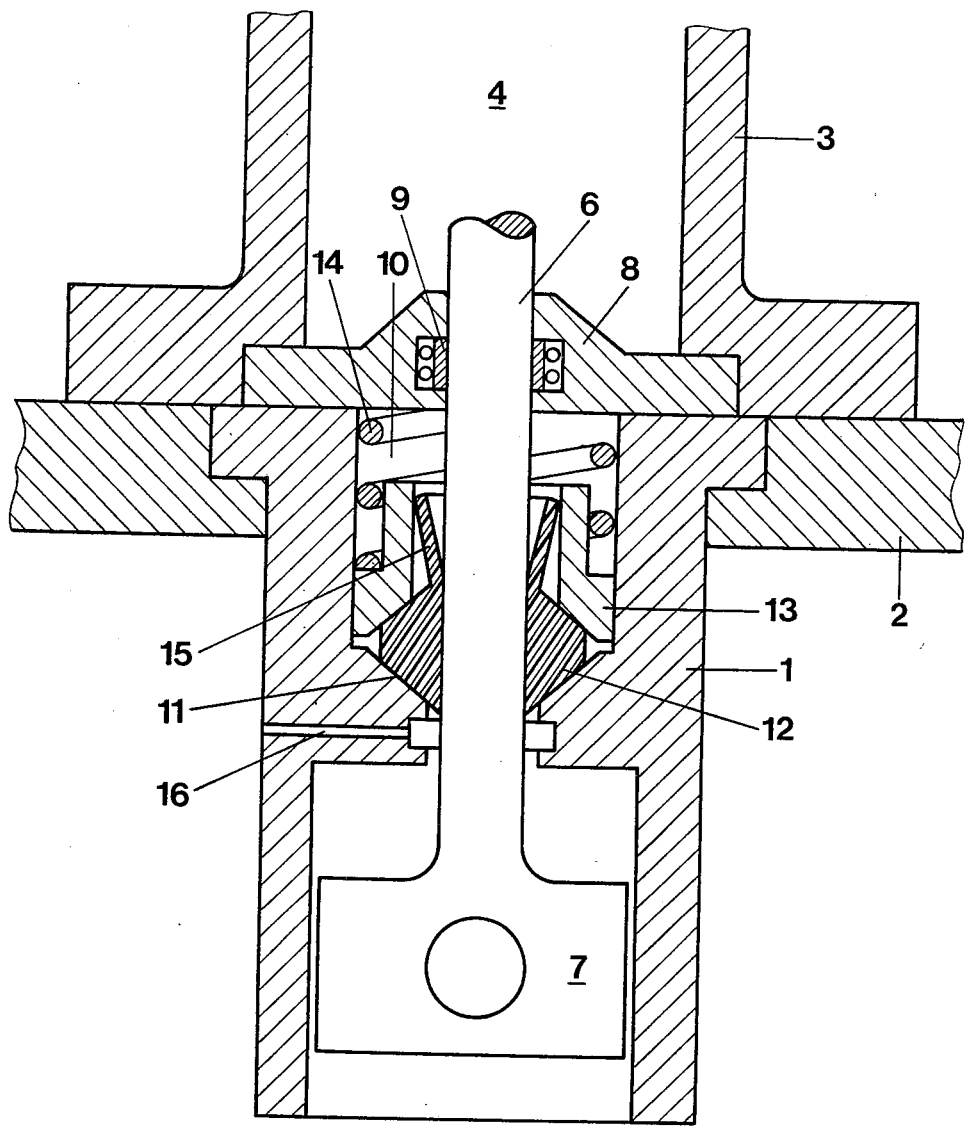

PISTON ROD SEAL

This invention relates to a construction comprising sealing means for preventing gas leakage along a rectlinearly-reciprocating piston rod, a wall through which the piston rod extends, a high pressure gas chamber at one side of said wall, a low pressure gas chamber at the other side of said wall, said sealing means including oil-feed means inducing around the piston rod in the low pressure gas chamber a film of oil and biassing means maintaining radial forces on a gland mounted around the piston rod adjacent to said wall.

The basic principle of the prior art seals is that an oil film is drawn between the adjacent surfaces of the piston rod and the sealing gland. This oil film will be moving towards the high pressure gas chamber and prevent leakage of gas in a very efficient manner. Seals of this type have been described in e.g. the British Pat. Specifications Nos. 1,342,707 and 149,686. However, in certain applications such as hot engines leakage of oil into the high gas pressure chamber should be avoided. The prior art referred to above shows means for removing the oil passing the gland. Said means may include a special scraper ring—known e.g. from the British Pat. Specification No. 1,458,797 and may even include special filters.

The known constructions have therefore been rather complicated and thus expensive.

The object of the invention is to provide a simpler and thus more reliable and cheaper construction of a seal suitable for a hot gas engine and according to the invention this is obtained thereby that the sealing gland is provided with a tubular extension having a slightly increasing inner diameter in the direction towards the high pressure chamber, the extension being located outside the part of the gland exposed to radial forces.

Hereby it is obtained that any oil passing between the gland and the piston rod in the direction towards the high pressure gas chamber will be accumulated in the ring—shaped gradually widening reservoir limited by the piston rod surface and the inner surface of the tubular extension of the gland. The slightly increasing gap between said surfaces will cause a pumping effect during the oscillating movement of the piston rod and reverse the oil flow until a balance between the oil transportation in the two directions along the piston rod is obtained.

The invention will be described in more detail with reference to the drawing showing a vertical section through a construction according to the invention.

The construction shown consists of a housing 1 forming a part of a wall 2 carrying a cylinder 3 of a hot gas engine. Said cylinder contains a working gas—e.g. hydrogen—of a pressure which may vary cyclically between 15 and 20 MPa. The interior of the cylinder is designated by the reference numeral 4. The housing 1 extends into a crank casing 5 containing air at atmospheric pressure. A piston rod 6 the lower end of which is shaped as a cross-head 7 extends through a central opening in the housing 1. The piston rod 6 also extends through an opening in a cover 8 fastened at the top of the housing 1. A seal 9 is provided between adjacent surfaces of the piston rod 6 and the opening in the cover 8. The seal 9 serves to maintain a uniform gas pressure below the cover 8 corresponding to the mean gas pressure above the cover 8. However, the seal 9 may be omitted as an oscillating pressure below the cover 8 generally will have no detrimental influence upon the device.

The central opening in the housing 1 limits a cavity 10 having a conically depressed central bottom surface 11 engaged by a correspondingly shaped gland 12 made of graphite reinforced polytetrafluorethylene. Said gland 12 is wedged between the surface 11 and a conical surface of a metal ring 13 actuated in the axial direction by a compression spring 14. The wedging force of the spring 14 will cause the gland 12 to be forced radially inwards against the surface of the piston rod 6. The gas pressure in the cavity 10 will multiply this force.

The gland 12 is provided with a tubular extension 15 having an inner diameter increasing slightly in the direction upwards (towards the high pressure chamber 4). The drawing shows the increase in diameter exaggerated. The actual dimensions may be the following:

diameter of piston rod: 12 mm
axial length of gland at piston rod surface: 9 mm
axial length of gland extension: 11 mm
inner diameter of gland extension at top: 12.9 mm During operation of the device oil is constantly supplied to the lower end of the piston rod via a passage 16. Said oil lubricates and cools the piston rod 6. A thin film of oil is drawn into the narrow space between the engaging surfaces of the gland 12 and the piston rod 6. This film of oil will effectively prevent any escape of gas between the piston rod and the gland 12. However, any constant flow of oil in the upward direction along the piston rod 6 should be avoided as it eventually would cause oil to enter into the space 10 and finally into the chamber 4.

The conically ring shaped part of the space 10 limited by the surface of the piston rod 6 and the inner surface of the tubular extension 15 of the gland 12 will cause any oil accumulated therein to be moved downwardly as a consequence of a pumping effect caused by the oscillating movement of the piston rod 5. Thus a balance of oil flows in two axial directions will occur and no resulting oil transport will arrise.

The gland 12 and its extension 15 may be manufactured by originally shaping a unit having a uniform diamter cylindrical hole and subsequently deforming the extension part by fitting it on a conical mandrel. The deformation may be made permanent by heating the unit while mounted on the mandrel.

A device having the above specific dimensions was tested with a piston stroke of 42 mm at a speed of 3100 double-strokes per minute. The pressure of the gas to be sealed from the atmosphere was varying 3100 cycles per minute between 8 and 10 MPa during 300 hours. After the test no oil could be traced to have passed the seal and no wear of the gland or of the piston rod could be seen or measured.

I claim:

1. A construction comprising sealing means for preventing gas leakage along a rectlinearly—reciprocating piston rod (6), a wall (1, 2) through which the piston rod (6) extends, a high pressure gas chamber (4) at one side of said wall (1, 2), a low pressure gas chamber (5) at the other side of said wall (1, 2), said sealing means including oil-feed means (16) inducing around the piston rod (6) in the low pressure gas chamber (5) a film of oil and biassing means (13, 14) maintaining radial forces on the gland (12) mounted around the piston rod (6) adjacent to said wall (1, 2), characterised in that the sealing gland (12) is provided with a tubular extension (15) having a slightly increasing inner diameter in the direction towards the high pressure chamber (4), the extension (15) being located outside the part (12) of the gland exposed to radial forces.

2. A construction as claimed in claim 1 characterised in that said gland (12) is made of graphite reinforced polytetraflourethylene and is integral with its tubular extension (15).

* * * * *